United States Patent
Benkel et al.

(10) Patent No.: US 7,108,269 B2
(45) Date of Patent: Sep. 19, 2006

(54) PLUG FOR THE SEALING CLOSURE OF AN OPENING IN A SHEET OF A BODY OR THE BOTTOM OF AN AUTOMOBILE

(75) Inventors: Matthias Benkel, Igersheim (DE); Alexander Limpert, Salz (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 354 days.

(21) Appl. No.: 10/259,830

(22) Filed: Sep. 30, 2002

(65) Prior Publication Data

US 2003/0062693 A1 Apr. 3, 2003

(30) Foreign Application Priority Data

Oct. 1, 2001 (DE) .................................. 101 48 493

(51) Int. Cl.
*F16L 5/02* (2006.01)
*B65D 41/12* (2006.01)

(52) U.S. Cl. .............................. 277/606; 277/606; 16/2; 16/2.1; 174/65 G; 220/307

(58) Field of Classification Search ................. 277/606, 277/607; 16/2, 2.1; 174/65 G, 152 G; 220/307, 220/DIG. 19
See application file for complete search history.

(56) References Cited

U.S. PATENT DOCUMENTS

| 4,041,241 | A | * | 8/1977 | Olmstead et al. | ....... 174/153 G |
|---|---|---|---|---|---|
| 4,334,632 | A | * | 6/1982 | Watanabe | ................ 220/787 |
| 4,784,285 | A | * | 11/1988 | Patel | ..................... 220/782 |
| 4,938,378 | A | * | 7/1990 | Kraus | ........................ 220/789 |
| 5,353,472 | A | * | 10/1994 | Benda et al. | ................. 16/2.2 |
| 5,453,579 | A | * | 9/1995 | Cohea | .................... 174/153 G |
| 5,504,156 | A | * | 4/1996 | Takezaki et al. | .............. 525/93 |
| 5,702,133 | A | * | 12/1997 | Pavur et al. | ................. 292/80 |
| 5,709,309 | A | * | 1/1998 | Gallagher et al. | .......... 220/229 |
| 5,870,799 | A | * | 2/1999 | Benda | ........................ 16/2.1 |
| 6,296,136 | B1 | * | 10/2001 | Huet | ........................ 220/233 |
| 6,557,208 | B1 | * | 5/2003 | Huet | ........................ 16/2.1 |

FOREIGN PATENT DOCUMENTS

DE 198 28 328 A1 12/1999

* cited by examiner

*Primary Examiner*—Anthony Knight
*Assistant Examiner*—Enoch E. Peavey
(74) *Attorney, Agent, or Firm*—Lowe Hauptman & Berner, LLP

(57) ABSTRACT

A plug for the sealing closure of an opening in a sheet includes an integral body including a cap portion having an annular shirt portion and a cover portion connected to one end of the shirt portion. The body further includes a flange portion extending obliquely outwardly and downwardly and an annular sealing surface approximately at the same level as the connection of the cover portion to the shirt portion and below the connection of the flange portion. The plug body can be urged into the opening by an axial pressure. An outward pivoting of the flange portion upon insertion of the plug body into the opening exerts a radial expansion force and/or a pivoting force on the sealing surface so that the body's material in the area of the sealing surface is formed against the other side of the sheet.

21 Claims, 2 Drawing Sheets

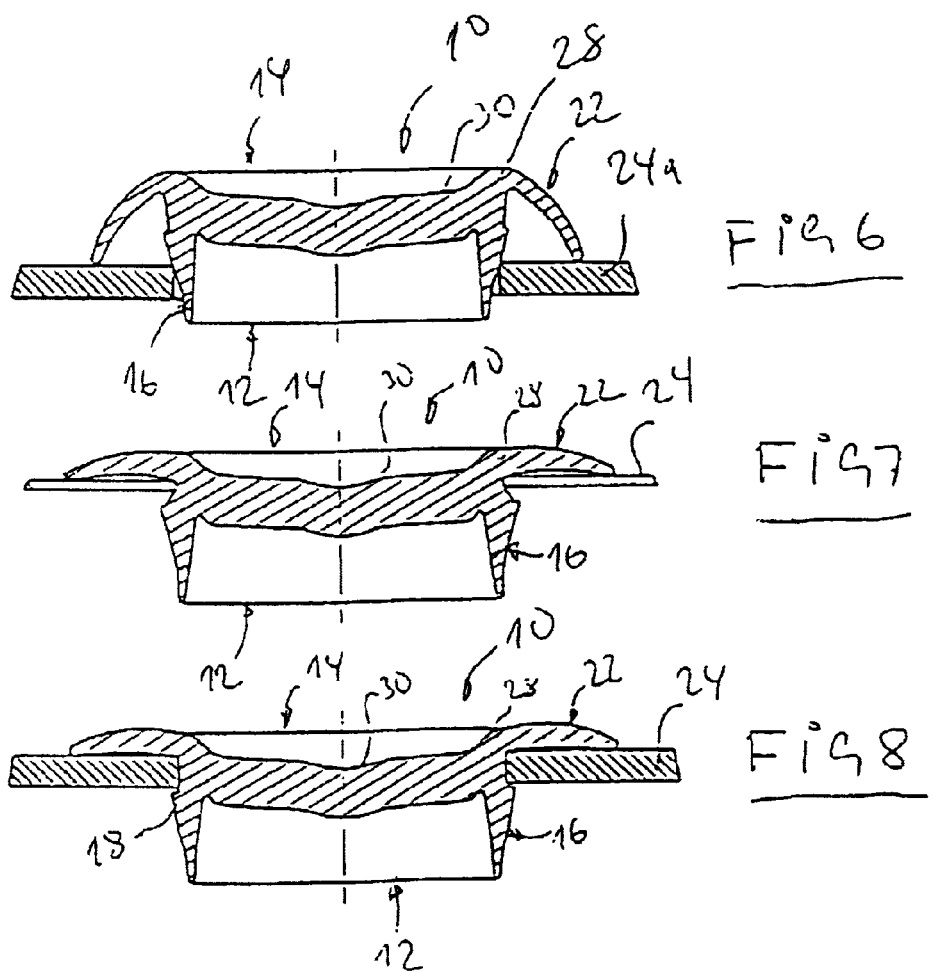

PLUG FOR THE SEALING CLOSURE OF AN OPENING IN A SHEET OF A BODY OR THE BOTTOM OF AN AUTOMOBILE

FIELD OF THE INVENTION

This invention relates to a plug for the sealing closure of an opening in a sheet of a body or the bottom of an automobile.

BACKGROUND OF THE INVENTION

Body components or bodies of automobiles are immersed into appropriate baths to undergo treatment or painting. Suitable holes require to be provided to allow the liquid to flow in and to flow out again. Such holes have to be closed afterwards, primarily for protection from corrosion. A large number of different closing plugs have become known to close such openings. The are commonly made of plastics and are mounted by hand by urging them into the opening. To this end, such closing plugs mostly have a flange which leans against one side of the sheet, and locking means which grip behind the other side of the sheet. Since air and/or water is to be prevented from entering the flange sealingly bears against the sheet and an additional sealing agent may be provided, e.g. a hot-melt adhesive. If a hot-melt adhesive material is used it may be contemplated to omit the snap connection and to arrange for the plug to be mounted exclusively by means of the hot-melt adhesive. Finally, plugs are also known which are completely formed from a hot-melt adhesive material. As is known, openings or holes in the area of automobile bodies have a sound transmission characteristic different from that of the material outside the holes. Another sound transmission will also result if a closing plug is employed. Moreover, there is a danger that the closing plug will vibrate, thus producing noise.

SUMMARY OF THE INVENTION

The object is attained by the features of claim 1.

In the inventive closing plug, an integral plug body is provided which is made of a suitable plastic. The plastic has elastomeric characteristics which are sufficient to readily urge the plug, e.g. by hand, into a hole in the sheet with the plug body being fixedly mounted in the hole and providing sufficient tightness, on the other hand. The way to achieve this will be explained below.

The plug body includes a cap portion and a circumferential flange. The cap portion has an annular shirt portion and a cover portion. The cover portion is connected to one end of the shirt portion. The shirt portion tapers on the outer side towards the free end and has a diameter which is somewhat smaller than the diameter of the hole to allow the plug body to be readily introduced into a hole. The flange is connected approximately at the level of the cover portion and extends outwardly and downwardly far beyond the underside of the cover portion. Approximately at the level of the connection of the cover portion to the shirt portion and below the connection of the flange, an annular circumferential sealing surface is provided the height of which is somewhat larger than the thickness of the sheet and the outer diameter of which is somewhat larger than the diameter of the hole or sheet opening. To allow the plug body to be urged into the sheet opening and a sufficient contact pressure of the sealing surface to be achieved on the hole wall the connection of the cover portion on the shirt portion is formed such that the plug body can be urged into the opening by an axial pressure on the cover portion under a temporary reduction of the outer diameter of the sealing surface. According to the invention, provisions are made for the connection of the flange to the cover portion and the connection of the shirt portion to the cover portions as well as the dimensioning of these portions in the connection area to be such that an outward pivoting of the flange portion upon insertion of the plug body into the opening approximately into the plane of the associated side of the sheet exerts a radial expansion force and/or a pivoting force onto the sealing surface so that the material in the area of the sealing surface, on the rear side of the sheet, is formed against the rear side.

Because of the geometry of the inventive plug, the plug circumferentially claws its body into the hole wall in the area of the sealing surface and is deformed to define an annular bead behind the sheet, which causes the plug body to be firmly held in the hole. This noticeably reduces the natural vibrations of the plug body. In addition, the contact pressure exerted by the sealing surface in the area of the hole wall leads to a significant sealing action in the hole area so that the passage of a fluid is prevented. A passage of sound is not possible either. An additional sealing action is obtained because the flange is pressed against one side of the sheet.

According to an aspect of the invention, the sealing surface is cylindrical or of a slightly conical shape with its diameter decreasing towards the shirt portion. The height of the sealing surface may be dimensioned so as to allow the plug body to be inserted into openings of sheets having different thicknesses, e.g. from 0.6 to 2mm in thickness.

According to another aspect of the invention, the upper side of the flange is convex and the lower side is rounded in a convex way. As a result, the outer edge of the flange bears against the sheet side facing it at a relatively large force, thus causing efficient sealing.

According to a further aspect of the invention, the action described for the inventive plug body is primarily achieved when the area connecting the flange portion to the cover portion is formed as an annular bead which is axially aligned to the shirt portion and surrounds the cover portion. As a result, the connection of the flange portion is disposed to be relatively higher than is the cover portion which can be of a relatively large thickness, e.g. from 0.6 to 3 mm, and is of an approximately equal thickness along its extension. Preferably, however, it is provided with a trough-shaped depression which can extend approximately up to the shirt portion. However, it would also be imaginable to form the cover portion to be concave as seen from the top. The underside is slightly convex, accordingly. A central indentation in the cover portion makes it possible to engage a tool or even a finger to urge the plug body into the opening in the sheet.

According to a further aspect of the invention, the outer side of the shirt portion below the sealing surface can have formed thereon a plurality of circumferentially spaced noses which define shoulders on the side facing the sealing surface. Thus, for instance, four noses may be provided and are equally spaced from each other. The catch noses merely serve as an additional loss-preventing safety device. They are insignificant in efficiently mounting the plug body.

The plug body is formed from a plastic material of a relatively high density to obtain a sound transmission as low as possible in the area thereof. A plastic material which is offered for use is a thermoplastic elastomer or ethylene-propylene elastomer to which another substance is admixed, if required, to increase its density. For instance, such a material may be barium sulfate.

BRIEF DESCRIPTION OF THE DRAWINGS

The invention will be explained in more detail below with reference to an embodiment shown in the drawings.

FIG. 6 shows the closing plug of FIGS. 1 and 4 being inserted into an opening in a sheet.

FIG. 7 shows the closing plug of the invention completely inserted into an opening in a sheet with the sheet being of a relatively small thickness.

FIG. 8 shows a representation similar to FIG. 7 where the sheet is of a relatively large thickness.

DETAILED DESCRIPTION OF THE INVENTION

Figure 1:
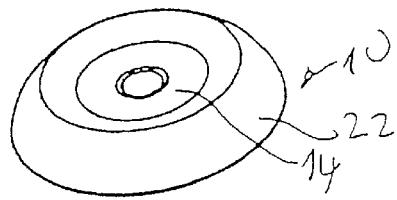
FIG. 1 shows a perspective view and plan view of a closing plug according to the invention.
Figure 2:
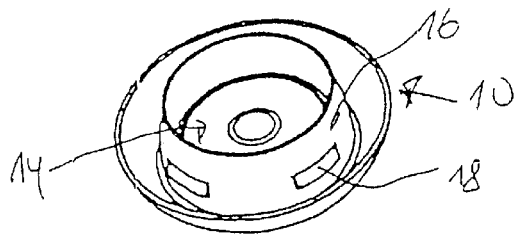
FIG. 2 shows a perspective view of the closing plug of FIG. 1 from its underside.
Figure 3:
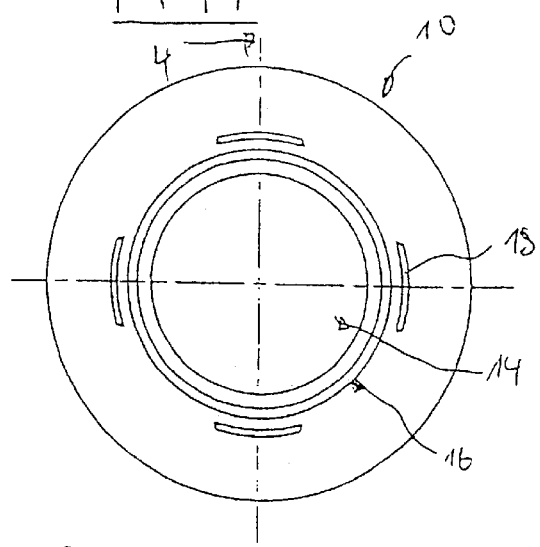
FIG. 3 shows a bottom view of the closing plug of FIG. 1.

Referring to FIGS. 1 through 4, a plug body 10 is shown which is integrally formed from a suitable plastic material, e.g. a thermoplastic elastomer, EPDM or the like. The basic material may have admixed thereto a substance which increases the density of the material, e.g. barium sulfate or the like.

The plug body 10 has a cap-shaped portion 12 which is composed of a cover portion 14 and a shirt portion 16. The shirt portion 16 is annularly cylindrical at its inside and is conical at the outer side with its outer diameter decreasing towards the free end. Four catch noses 18 provided at a circumferential spacing of 90° are formed to the outer side of the shirt portion 16 and define a rest shoulder 20. This fact will be referred to farther below. Formed to the outer side of the cover portion 14 is a flange 22 which extends outwardly and downwardly, i.e. beyond the underside of the cover portion 14. The flange 22 is rounded in a convex way at the upper side and in a concave way at the underside.

Figure 4:
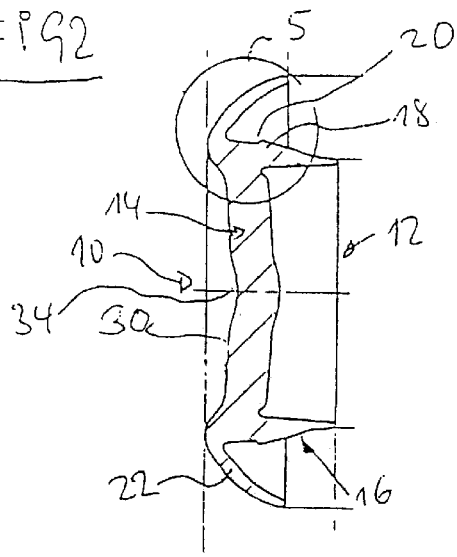
FIG. 4 shows a section through the plug of FIG. 3 along lines 4—4.
Figure 5:
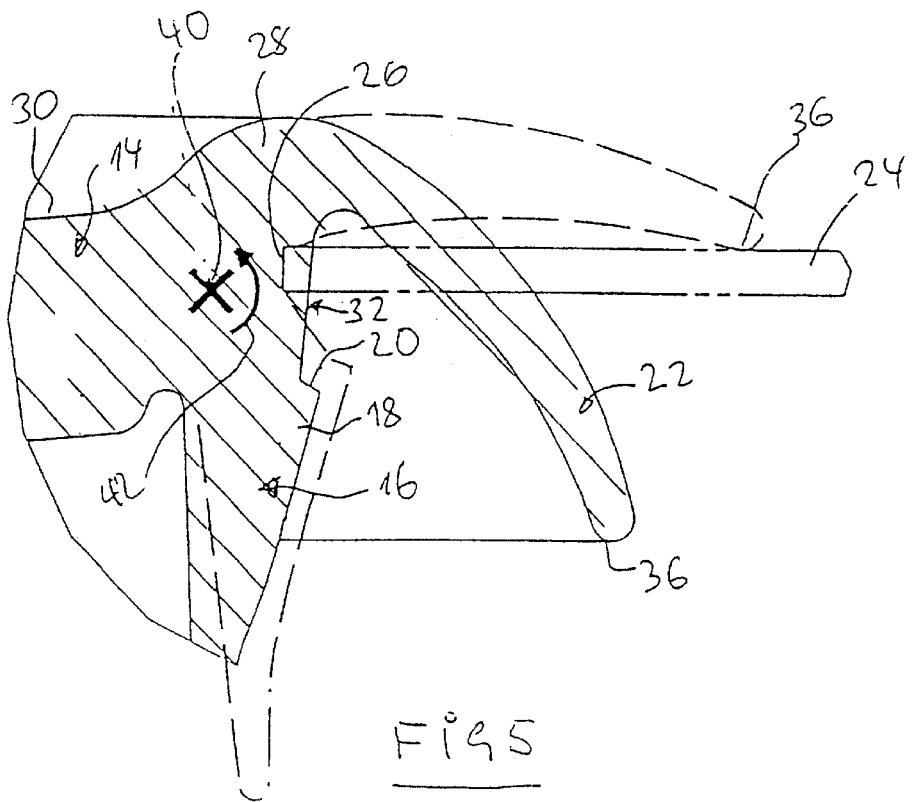
FIG. 5 shows an enlarged view of detail 5 of FIG. 4.

In FIG. 5, a portion 5 of the plug body 10 of FIG. 4 is shown in full lines and a hatched area, and its insertion into the hole of a sheet 24 is shown in dotted lines. The hole is outlined at 26. At the level of the shirt portion 16, the cover portion 14 is surrounded by a annular bead 28 which extends outwardly to end in the flange 22. Between a countersunk area or depression 30 at the upper side of the cover portion 14 and the upper side of the flange 22, the upper side of the bead 28 defines a gently rounded transition to the outer side.

Below the connection of the flange 22 to the bead 28 and above the shoulders 20, an annular conical sealing surface 32 is formed which is located at approximately the same level as is the cover portion 14. The sealing surface 32 is slightly conical with its diameter decreasing towards the shirt portion 16. Altogether, the outer diameter of sealing surface 32 is somewhat larger than the diameter of the hole 26 in the sheet 24. The cover portion 14 is relatively thick, e.g. 3 mm (the thickness of the sheet of FIG. 5 being 1 mm and the diameter of the hole 26 being 20mm). As was mentioned already, the cover portion which is of an approximately equal thickness along its extension exhibits the depression 30 with a trough 34 approximately in the centre, which enables the thumb to be placed in this point to urge the plug body into the hole 26 of the sheet 24. The underside of the cover portion 14 is of a complementary shape.

As is apparent from FIG. 5, while the plug body 10 is inserted into the hole 26, the flange 22 is pivoted by a considerable extent approximately up to the plane of the sheet 24 facing it, which causes an outer edge 36 of the flange 22 to sealingly bear, under the force of a spring, against the side facing it of the sheet 24. Urging the plug body 10 in by an axial pressure on the cover portion 14 causes the plug body to be deformed and the sealing surface 32 to undergo a certain reduction in diameter so that this temporary deformation allows the plug to be inserted into the hole 26 of the sheet. Pivoting the flange 22 and correspondingly connecting the flange 22 to the plug body, connecting the cover portion 14 to the shirt portion 16, and the entire geometry in this area of the plug body cause the flange 22 to be distorted about the point 40 as shown by the arrow 42. This deformation of the plug body in the area described results in the fact that not only is a radial pressing force exerted on the wall of the hole 26, but the sealing surface 32 is additionally pivoted to the effect that the material is radially formed sidewards and upwards below the sheet 24 and at its rear side so that some sort of bead will form, which efficiently keeps the plug body in the hole 26. In this way, sealing is effected in the hole 26 so that neither a fluid nor an air sound may pass through. The air sound is attenuated via the material of the cover portion 30 that is relatively thick.

The complete installation of the plug body 10 of FIG. 5 which was described is also apparent from FIG. 7. FIG. 6 illustrates the insertion of the plug body into a sheet 24a which is of a somewhat larger thickness at the initial stage, e.g. a thickness of 3 mm. FIG. 8 shows the plug body 10 of FIG. 6 completely urged into the hole of the sheet 24a.

From FIGS. 5 through 8, it can be appreciated that the noses 18 and shoulders 20 are not employed in any of the cases. They merely serve for additional loss prevention.

From FIGS. 5 through 8, it can also be appreciated that the same plug body 10 may be employed for sheets of different thicknesses, in which case, however, the hole opening requires to be of approximately the same diameter.

The plug body 10 described can easily be mounted, snaps in audibly and resists a water column of at least 300 mm against the direction of mounting.

What is claimed is:

1. A plug for sealing an opening in a sheet, said plug comprising an integral body, an entirety of said body being made of the same material, said body including:

a cap portion having an annular shirt portion and a cover portion connected to one end of the shirt portion, the shirt portion having a free end opposite to the cover portion and tapering on an outer side thereof towards the free end, the free end having an outer diameter adapted to be smaller than the diameter of the opening, wherein said cover portion is configured to prevent liquid from passing therethrough;

a flange portion approximately at the level of the cover portion, which flange portion extends obliquely outwardly and downwardly; and an annular sealing surface approximately at the same level as the connection of the cover portion to the shirt portion and below a connection of the flange portion to the cover portion, a height of the sealing surface being adapted to be larger than the thickness of the sheet, an outer diameter of the sealing surface being adapted to be slightly larger than the diameter of the opening;

wherein the cover portion and its connection to the shirt portion is formed such that the plug body can be urged into the opening by an axial pressure on the cover portion under temporary reduction of the outer diameter of the sealing surface; and wherein the connection of the flange portion to the cover portion, the connection of the shirt portion to the cover portion, and dimensioning of said portions are Such that an outward pivoting of the flange portion upon insertion of the plug body into the opening approximately into the plane of an associated side of the sheet exerts a radial expansion force and/or a pivoting force on the sealing surface so that the material of said body in an area of the sealing surface, on an opposite side of the sheet, is formed against said opposite side of the sheet.

2. The plug of claim 1, wherein the sealing surface is slightly conical with a taper towards the shirt portion.

3. The plug of claim 1, wherein an upper side of the flange portion is convex and a lower side of the flange portion is concave.

4. The plug of claim 1, wherein the connection of the flange portion to the cover portion is formed as an annular bead which is axially aligned to the shirt portion and surrounds the cover portion.

5. The plug of claim 1, wherein the cover portion has a trough-shaped depression which extends radially outwardly up to the shirt portion and has a deepest point in a central region of cover portion.

6. The plug of claim 1, wherein at the outer side of the shirt portion below the sealing surface a plurality of circumferentially spaced noses is formed which form shoulders facing the cover portion.

7. The plug of claim 1, wherein the plug body is made of plastic material of relatively high density.

8. The plug of claim 7, wherein said plastic material includes a basic/material selected from the group consisting of a thermoplastic elastomer, polypropylene and an ethylene propylene elastomer.

9. The plug of claim 8, wherein barium sulfate is mixed to the basic material.

10. The plug of claim 1, wherein the cover portion has a thickness of 3 mm or more.

11. The plug of claim 1, wherein said flange portion extends obliquely outwardly and downwardly to a level below a lower surface in a central region of the cover portion.

12. A plug for sealing an opening in a sheet, said plug comprising an integral body which includes:

a cover portion formed without a through bore therethrough so as to form a sealing closure for the opening;

an annular shirt portion connected to a lower portion of a periphery of said cover portion; and an annular flange portion connected to an upper portion of the periphery of said cover portion;

wherein said flange portion extends obliquely, outwardly and downwardly from said upper portion, which is at a level above an upper surface of a central region of said cover portion, to a level below a lower surface of said central region; and an outer circumferential surface of said periphery defines a conical sealing surface between the upper and lower portions where said flange portion and said shirt portions are connected to said cover portion, respectively, said sealing surface being adapted to be pressed against a side of the sheet when said plug is being pushed into the opening from an opposite side of the sheet.

13. The plug of claim 12, wherein an entirety of said plug is made of the same material.

14. The plug of claim 12, wherein said shirt portion tapers toward a free end thereof and away from said cover portion, said shirt portion including an inner cylindrical surface and an outer conical surface that extends from the lower portion of said periphery of said cover portion to said free end.

15. The plug of claim 12, wherein said central region is contiguous to said periphery and has a substantially constant thickness.

16. The plug of claim 12, wherein the cover portion has a trough-shaped depression in the central region, said depression extending radially outwardly up to the upper portion of said periphery and having a deepest point at the center of said cover portion.

17. The plug of claim 12, wherein said sealing surface is a conical surface converging in a direction from the upper portion to the lower portion.

18. In combination, a sheet having an opening and a plug for sealing said opening in said sheet, said plug comprising an integral body which includes:

a cover portion formed without a through bore therethrough so as to form a sealing closure for said opening;

an annular shirt portion connected to a lower portion of a periphery of said cover portion; and an annular flange portion connected to an upper portion of the periphery of said cover portion;

wherein before said plug is pushed into said opening, said flange portion extends obliquely, outwardly and downwardly from said upper portion, which is at a level above an upper surface of a central region of said cover portion, to a level below a lower surface of said central region; and an outer circumferential surface of said periphery defines a sealing surface between the upper and lower portions where said flange portion and said shirt portions are connected to said cover portion, respectively, wherein said sealing surface is pressed against a lower side of said sheet when said plug is being pushed into said opening from an upper side of said sheet.

19. The combination of claim 18, wherein an entirety of said plug is made of the same material.

20. The combination of claim 18, wherein the cover portion has a trough-shaped depression in the central region, said depression extending radially outwardly up to the upper portion of said periphery and having a deepest point at the center of said cover portion.

21. The combination of claim 18, wherein said shirt portion includes, on an outer side thereof and below said sealing surface, a plurality of circumferentially spaced projections which form shoulders facing upwardly, said projections do not engage said lower side of said sheet after said plug has been completely pushed into said opening.

* * * * *